Figure 3:
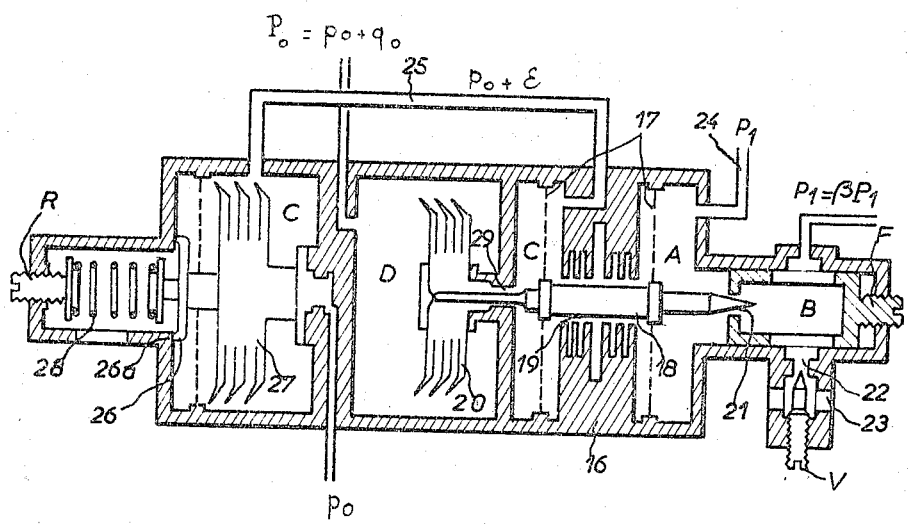

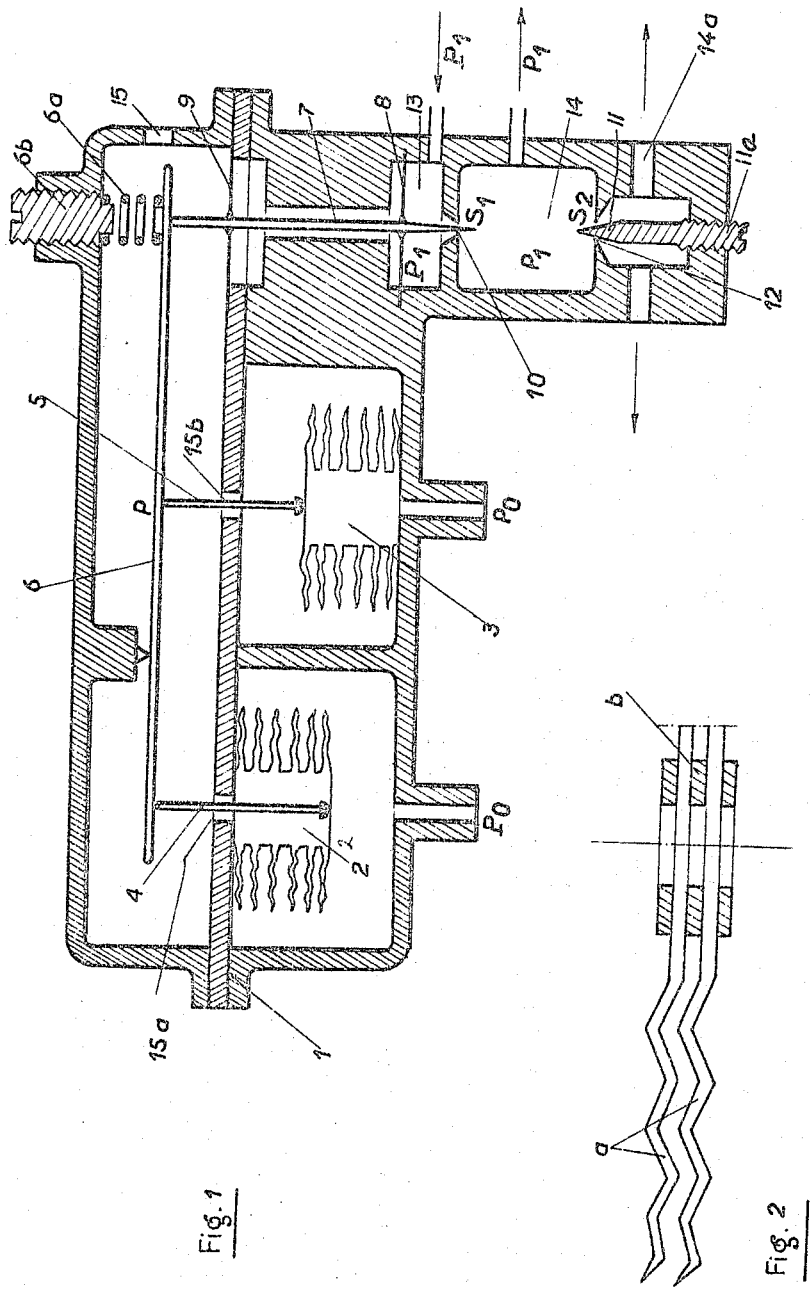

United States Patent Office 3,324,870
Patented June 13, 1967

3,324,870
PRESSURE-SIGNAL AMPLIFYING DEVICE, ESPECIALLY APPLICABLE TO THE REGULATION OF AIRCRAFT IN FLIGHT DURING LANDING-APPROACH
Ange Pierre Guerin, Paris, France, assignor to Societe Nationale d'Etude et de Construction de Moteurs d'Aviation, Paris, France, a French company
Filed May 22, 1964, Ser. No. 369,504
Claims priority, application France, May 24, 1963, 935,977
12 Claims. (Cl. 137—82)

The present invention has for its object a detector and amplifier device which receives at its input a pressure signal and produces at its output a pressure signal of greater power which is a function of the said input signal. It also comprises the application of this device to the regulation of the thrust of aircraft during landing approach.

The operation of landing with high-speed aircraft necessitates great skill on the part of the pilot. The result of a piloting error at the moment of landing may be very serious. If the operation parameters of the aircraft and the engine (angle of landing, trajectory, speed, condition of flight, etc.) are not correctly chosen, the pilot runs the risk, depending on the circumstances, of making a short landing, a rough landing, stalling, high-speed of descent, excessively long landing, etc. The pilot's attention, already fully engaged, before landing, by the control-panel apparatus (throttle control, air-speed indicator, variometer, etc.) must also take into account the essential external factors (landing ground, wind, landing conditions). The load carried by the aircraft (armament, fuel, freight, passengers) must also be taken into consideration.

This problem is particularly acute in the case of aircraft having very high speeds of flight, such as delta-wing aircraft, for which it is necessary to carry out the landing approach in the zone known as the second condition of flight. In this zone of speeds, the aircraft is under unstable propulsion, and it is necessary to adjust the thrust at every instant in order to keep the aircraft on its trajectory, which otherwise would be very unstable, the aircraft being liable to stall or to recover its stability of propulsion in the first condition of flight, that is to say at a speed which is too high for landing.

The maintenance of the speed at a suitable value for approach compels the pilot to make continual adjustment of the reactor thrust. Attempts have therefore been made to carry out this adjustment of the thrust automatically in order to free the pilot's attention for other duties.

If the pilot brings the aircraft into conditions such that an equilibrium is obtained between the reactor thrust and the drag of the aircraft, this equilibrium will be automatically maintained if the thrust is controlled in dependence on the drag. A control of this kind may be obtained, for example, by controlling the reactor thrust in dependence on the indicated speed or on the incidence.

The variation in thrust may be obtained for example by keeping the engine speed fixed and acting on a regulator controlling the cross-section of the discharge nozzle. Alternatively, the discharge nozzle cross-section may be kept fixed, and action is taken on a tachometer regulator or on the throttle control.

In all cases, the landing-approach regulator is composed of a detector and amplifier device for the input signal and a device for controlling the engine. The first device has the function of transforming the input signal $q_0$ (for example the indicated speed or the incidence) to an output signal $p$ which is a function of $q_0$ and has a very much greater power.

The detector and amplifier device according to the invention comprises at least one manometric capsule receiving a pressure signal and displacing a member which controls a fluid-pressure forming the output signal, the said capsule being composed of elements capable of coming into mechanical abutment against each other when the pressure applied to the capsule exceeds a certain limit.

A capsule composed of elements capable of coming into mechanical abutment with each other also forms part of the present invention.

In one form of embodiment, the amplifier device comprises two of these capsules, subjected respectively to two pressures constituting together the input signal and co-operating in displacing the member which produces the output signal, the connection between the two capsules permitting each of them to come separately into mechanical abutment.

The description which follows below with reference to the accompanying drawings (which are given by way of example only and not in any sense by way of limitation) will make it easy to understand the various particular features of the invention and the manner in which they are carried into effect, any arrangement which is brought out either in the text or in the drawings being understood to fall within the scope of the present invention.

Figure 4:
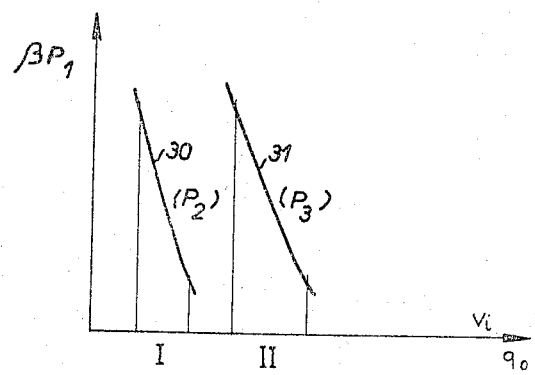

FIGURE 1 represents a view in cross-section of a detector-amplifier device according to the invention.
FIGURE 2 is a partial axial section of a capsule.
FIGURE 3 is a view similar to that of FIGURE 1, showing a further form of embodiment.
FIGURE 4 is a diagram showing the operation of the detector-amplifier device.

The detector-amplifier of FIGURE 1 can especially be employed for the regulation of the landing-approach flight of a delta-wing aircraft. It receives from a speed probe (not shown) the total pressure $P_0$ and the static pressure $p_0$ and delivers at its output a modulated pressure $p_1$ which is utilized to control the thrust by means of a known device, for example a pneumatic regulator of the section of the discharge nozzle.

The apparatus comprises a casing 1 containing two capsules 2 and 3, mounted in opposition by means of rods 4 and 5 pivotally mounted on the lever 6.

This lever is acted upon by a spring 6a, adjustable by means of a screw 6b, and actuates a needle 7 suspended from two perforated diaphragms 8 and 9, and adapted more or less to close the orifice in a dividing plate 10 which provides a communication between a chamber 13 and chamber 14. A needle 11, adjustable by means of a thread 11a screws into the casing 1 and more or less closes a dividing plate 12, the orifice of which provides a communication between the chamber 14 and the vents 14a.

The input signal, which in the example chosen is the indicated speed of the aircraft represented by the dynamic pressure, that is to say the difference between the total pressure $P_0$ and the static pressure $p_0$, is introduced into the capsules 2 and 3, the total pressure $P_0$ being applied to the exterior of the capsule 2 and the static pressure $p_0$ to the interior of the capsule 3.

A supply pressure $P_1$ for the apparatus is fed into the chamber 13 and the output signal is the pressure $P_1$ taken from the chamber 14.

Calculation has shown that the pressure in the chamber 14 depends only on the pressure $P_1$ in the chamber 13 and on the sections of passage $S_1$ for the dividing plate 10 and $S_2$ for the plate 12.

The fluid from the chamber 13 flows partially out into the casing through the perforations in the diaphragms 8 and 9 and flows from thence to the exterior through an orifice 15. The pressure $p$ in the interior of the casing is kept in the vicinity of the ambient pressure by means of the orifice 15 in the casing. The conditions of use of the device must be such that this pressure $p$ is always comprised between $P_0$ and $p_0$.

By virtue of the orifices 15$a$ and 15$b$, through which pass respectively the rods 4 and 5, this pressure $p$ existing inside the casing is led into the interior of the capsule 2 and around the capsule 3.

It will be observed that the capsules both work in the direction of compression, the highest pressure being always on the outside of the capsule. FIGURE 2 shows the construction of the capsules 2 and 3. Each of them comprises a plurality of annular bellows with flexible walls $a$, connected to each other at their central portions by full annular elements $b$. When the difference in pressure between the exterior and the interior exceeds a certain value, the elements $b$ come into abutment against each other.

These two arrangements are fundamental. They constitute a self-protection for the capsule against excess pressure, and this point is very important since, in the aeronautical application considered, excess pressures are frequent and considerable.

In fact, under the conditions of flight during landing, the capsule 2 for example is subjected to pressure differences varying from 50 to 60 grams per sq. cm. which correspond to the normal values of operation during the approach.

Under conditions of flight other than during landing, this capsule is subjected to pressure differences which may reach 2 kg./sq. cm. and this pressure would irremediably damage the capsule if all the elements did not come into mechanical abutment with each other.

The capsule 3 also works under similar conditions.

The coupling between the capsules and the leaders 4 and 5 is made with a certain play, which permits both capsules to come into abutment separately.

The form of construction indicated is obviously only an example, and alternative forms may be envisaged, in particular in the design of the needle 10.

The apparatus shown in FIGURE 3 is essentially composed of a casing 16, on which are fixed two perforated diaphragms 17 which support without friction a needle 18 passing through an orifice 19 in the casing 1, forming a labyrinth joint.

One extremity of the needle is in contact with a capsule 20; the other extremity of pointed shape can close more or less the orifice in a dividing plate 21 between a chamber A of the casing, receiving the supply pressure $P_1$ of the apparatus and a chamber B. A second dividing plate 22 with an orifice having a section adjustable by means of a needle-valve V provides a communication between the chamber B and the air-vents 23.

The greater part of the driving fluid (generally air) admitted at the pressure $P_1$ into the chamber A through the conduit 24, passes into the chamber B and is then evacuated into the ambient atmosphere through the passages 21 and 22 and the air-vents 23.

Calculation has shown that the pressure $P_1$ in the chamber B depends only on the pressure $P_1$ in the chamber A and in the sections of passage $S_1$ and $S_2$ of the dividing plates 21 and 22, at least as long as the flows is sonic in the dividing plate 22.

Between the two plates 21 and 22, the fluid pressure has a value $P_1 = \beta P_1$, which only depends on the pressure $P_1$ and on the section $S_1$ which is in turn a function of the position of the needle 18.

The small remaining part of the fluid from the chamber A passes through the perforations of the diaphragm 17 and through the clearance 19 between the needle 18 and the casing 16, is subjected during this travel to very considerable expansion and establishes in the chamber C of the casing a pressure in the vicinity of atmospheric pressure or of the static pressure $p_0$. This pressure will be represented by $p_0 + \epsilon$.

This chamber C, made-up of two compartments connected together by a tube 25 can be put in communication with the surrounding atmosphere by a non-return valve 26, which may open a passage of variable section. This valve 26 is actuated by a capsule 27 and a spring 28, the two elements acting as a single spring which would tend to force the valve 26 against its seating 26$a$.

The capsule 27 is put into communication with the static aircraft pressure $p_0$, which is well-defined.

The chamber D containing the capsule 20 is put into communication with the total aircraft pressure $P_0 = p_0 + q_0$. The interior of the capsule 20 communicates by an orifice 29 with the chamber C and is therefore at the pressure $p_0 + \epsilon$.

The operation of this device is as follows. The capsule 20 being subjected on the one hand to the pressure $p_0 + \epsilon$ within its interior and on the other to the pressure $p_0 + q_0$ at its exterior, its movement will be a function of the difference $(p_0 + q_0) - (p_0 + \epsilon) = q_0 - \epsilon$.

The capsule 27 plays the part of a pressure stabiliser; it is subjected at its interior to the pressure $p_0$ and at its exterior to the pressure $p_0 + \epsilon$; its movement will be a function of $\epsilon$ only. The pressure $\beta P_1$, which, as has been seen, depends on this movement, is thus a function of $\epsilon$.

For the values of $\epsilon < \epsilon_0$, the valve 26 remains closed.

For the values of $\epsilon > \epsilon_0$, the valve 26 opens and causes the pressure to drop. This value $\epsilon_0$ can be regulated by acting on the tension of the spring 28 by means of a regulating screw R.

The characteristic feature of the apparatus is a relation between the input signal $q_0$ and the output signal $\beta P_1$.

The capsules 20 and 27 are provided, as in the case of FIGURE 2, with elements $b$ adapted to come into abutment with each other. They are not coupled together mechanically and in consequence they can come into mechanical abutment independently. As in the case of FIG. 1, each of them is constantly subjected externally to a pressure greater than its internal pressure.

The chamber B slides in the casing 16 and its position in this casing can be regulated by an adjusting screw F. Action on the screws V and F gives a regulation of slope. Action on the screw R gives a regulation of level.

The devices designed in accordance with FIGURES 1 and 3 make it possible to obtain stabilization of the indicated speed in the selected zone.

In the foregoing description, it has been assumed that the output signal $\beta P_1$ is only affected by the value of $q_0$; in fact, this is only strictly accurate if the supply is effected at constant pressure. In reality, the needle 18 is subjected to several forces, one of which is represented by the formula:

$$[P_1 - (p_0 + \epsilon)]S$$

where S is the section of the needle at the separating partition. The output signal of the apparatus is a function of the pressure $P_1$.

It will thus be seen that if different values are given to the supply pressure $P_1$, a number of different regulating ranges are available. In FIGURE 4 for example, in which the dynamic pressure $q_0$ is plotted as abscissae and the pressure $\beta P_1$ constituting the output signal is plotted in ordinates, it can be seen that by utilizing two different values $P_2$ and $P_3$ of the supply pressure, it is possible to obtain two curves 30 and 31, corresponding to two different ranges of regulation I and II of the dynamic pressure $q_0$.

The supply pressure $P_1$ may be supplied by the compressor of the reactor of the aircraft; it is capable of variation by utilizing two different speeds of rotation of the reactor. The pilot is thus able to change his approach speed simply by employing a different engine speed.

It will be observed that the forms of embodiment described offer particular advantages resulting from the following special features:

(1) The use of the capsules permits a direct control of the needle without any intermediate amplifying device. The sensitivity of the capsules is such that the displacement of the needle may amount to several millimeters, which makes it possible to render negligible the small fluctuations due to thermal expansion or to acceleration;

(2) The arrangement of the capsules is effected in such manner that their movement as a function of the driving pressure is a movement of compression;

(3) The capsules are designed in such manner that their elements can come into mechanical abutment with each other;

(4) The connection between the capsules is effected in such manner that the two capsules can come into mechanical abutment separately.

The features (2), (3) and (4) constitute a self-protection system against excess pressures, which makes it possible to dispense with the usual devices of electrovalves with manual or automatic control, which are heavy, bulky and unreliable in operation.

The mechanisms produced in accordance with FIGURE 2 or FIGURE 4 may be built into an automatic landing device.

It will of course be understood that the forms of construction described are only examples and may be modified, in particular by the substitution of equivalent technical means, without thereby departing from the scope of the invention.

In particular, it is known to measure the incidence of an aircraft by means of the difference between two pressures, and these two pressures could be applied as the input signal in a detector-amplifier of the kind described, the output signal of this amplifier being utilized to obtain a regulation of the thrust as a function of the incidence.

What I claim is:

1. A detector and amplifier device comprising a casing, a pair of bellows within the casing, means connecting the exterior of the first bellows to a source of high pressure, means connecting the interior of the second bellows to a source of low pressure, means isolating the exterior of the first bellows from the second bellows, the exterior of the second bellows and the interior of the first bellows being connected to the internal pressure of the casing supplied at a substantially constant pressure intermediate said high and low pressure, said casing being vented at the exterior thereof via a leak passage, means operatively associated with said pair of bellows responsive to the differential between said high and low pressures and producing an output pressure which is a function of said differential, each of said bellows being composed of elements capable of coming into abutment with each other when the pressure difference between the exterior and interior of the bellows exceeds a predetermined limit, the operative association of each bellows with the means for producing an output being such as to permit each bellows to come separately into such mechanical abutment responsive to said excess predetermined limit.

2. A device in accordance with claim 1, in which the supply pressure is sent into a first chamber communicating on the one hand with the casing and on the other, through the intermediary of an orifice more or less opened by a closure member adapted to be displaced by the two capsules in co-operation, with a second chamber provided with a leakage to the exterior, the pressure of the said second chamber constituting the output signal.

3. A device in accordance with claim 2, in which the said closure member is laterally displaced and is coupled to the casing by at least one perforated diaphragm.

4. A device in accordance with claim 2, in which the said closure member is laterally displaced and is coupled to the said first chamber by at least one perforated diaphragm.

5. A device in accordance with claim 2, in which the fluid passes from the first chamber into the casing through a passage having a substantial resistance.

6. A device in accordance with claim 2, in which the two capsules are mounted in opposition by means of a transmission which actuates the closure member.

7. A device in accordance with claim 6, in which the said transmission comprises an adjustable elastic member permitting the force applied by the capsules on the closure member to be regulated.

8. A device in accordance with claim 2, in which the second chamber comprises a regulating member permitting the orifice to be displaced with respect to the closure member.

9. A device in accordance with claim 2, in which the said closure member is connected only to the capsule which is subjected to the higher of the two pressures constituting the input signal, the other capsule actuating a second closure member which opens and closes the orifice of the casing communicating with the exterior, so as to maintain within the interior of the said casing a substantially constant pressure higher than the second of the said pressures constituting the input signal.

10. A device in accordance with claim 9, in which an adjustable elastic device permits the force applied by the said other capsule on the second closure member to be modified in order to regulate the pressure inside the casing to the desired value.

11. A device in accordance with claim 2, further comprising means to regulate the leakage in said second chamber.

12. A device in accordance with claim 1, wherein said source of high pressure and said source of low pressure together measure the indicated speed of an aircraft, and wherein said output is utilized to actuate the control of the engine thrust of the aircraft.

References Cited

UNITED STATES PATENTS

| | | | |
|---|---|---|---|
| 2,682,893 | 7/1954 | Ziebold | 92—45 |
| 2,934,898 | 5/1960 | Graefe | 235—200 |
| 2,979,068 | 4/1961 | Griswold | 235—200 |
| 3,075,351 | 1/1963 | McCombs | 137—85 X |
| 3,078,670 | 2/1963 | Werner | 60—39.28 |

ALAN COHAN, *Primary Examiner.*